US007756123B1

(12) United States Patent
Huang et al.

(10) Patent No.: US 7,756,123 B1
(45) Date of Patent: Jul. 13, 2010

(54) APPARATUS, SYSTEM, AND METHOD FOR SWIZZLING OF A PCIE LINK

(75) Inventors: Wei-Je Huang, Fremont, CA (US); Nathan C. Myers, Round Rock, TX (US)

(73) Assignee: Nvidia Corporation, Santa Clara, CA (US)

( * ) Notice: Subject to any disclaimer, the term of this patent is extended or adjusted under 35 U.S.C. 154(b) by 737 days.

(21) Appl. No.: 11/614,901

(22) Filed: Dec. 21, 2006

(51) Int. Cl.
*H04Q 3/00* (2006.01)
(52) U.S. Cl. ........................ 370/359; 370/362

(58) Field of Classification Search ................. 370/359, 370/362
See application file for complete search history.

(56) References Cited

U.S. PATENT DOCUMENTS

2006/0041701 A1* 2/2006 Lin .......................... 710/306

* cited by examiner

*Primary Examiner*—Melvin Marcelo
(74) *Attorney, Agent, or Firm*—Cooley LLP

(57) ABSTRACT

A peripheral component interface express (PCIe) controller include a crossbar to reorder data lanes into an order compatible with PCIe negotiation rules. A full crossbar permits an arbitrary swizzling of data lanes, permitting greater flexibility in motherboard lane routing.

19 Claims, 5 Drawing Sheets

APPARATUS, SYSTEM, AND METHOD FOR SWIZZLING OF A PCIE LINK

FIELD OF THE INVENTION

The present invention is generally related to techniques to connect cards on a motherboard using a multi-lane data bus. More particularly, the present invention is directed towards swizzling of data lanes of Peripheral Component Interface Express Interface.

BACKGROUND OF THE INVENTION

A Peripheral Component Interface Express (PCIe) bus is a type of high speed bus of increasing interest in computing systems. FIG. 1 illustrates two components 105 and 110 which communicate via a PCIe bus 115. Each component 105 and 110 includes a bus interface 120. Bus interface 120 includes a physical layer 125, such as transmitters, receivers, input buffers and other circuits to support the PCIe bus 115. PCIe is a packet-based bus protocol. Data packets are formed in the transaction layer 135 and the data link layer 130. The operation of the physical layer 125, data link layer 130, and transaction layer 135 are described in section 1.5 of the PCI Express Base Specification Revision 1.1 (March 2005) published by PCI-SIG, the contents of which are hereby incorporated by reference. A higher data rate (second generation) version of PCIe having twice the data rate of first generation PCIe is described in the draft standard PCI Express 2.0 Base Specification.

The PCIe standard specifies that a PCIe link between components must have at least one lane 140, where each lane includes a set of differential pairs having one pair for transmission (Tx) and another pair for reception (Rx). That is, each lane has one simplex connection to transmit data to the other side of the link and one simplex connection to receive data from the other side of the link.

A PCIe bus interface 120 may include more than one transmitter/receiver pair. The PCIe standard allows for two or more lanes 140 to be aggregated to increase the bandwidth. A link training and status state machine (LTSSM) configures a set of data lanes as a link. A link between two components that aggregates a total of N lanes is described as a "by-N" link. A first generation of PCIe ("gen1") by-N link has a bandwidth of 2.5 xN Gbps in both the upstream and downstream directions. The second generation of PCIe ("gen2") has a xN link with twice the bandwidth, or 5 xN Gbps in both upstream and downstream directions.

As illustrated in FIG. 2, a conventional x N link between two components can also be pictured as being equivalent to two unidirectional data links 210 and 220 between the components to send and receive packets in two different directions. That is, a PCIe x N link has N lanes, which corresponds to a total of N dual simplex links. PCIe permits x1, x2, x4, x8, x12, x16, and x32 lane widths. As an illustrative example, in first generation PCIe, a single lane has 2.5 Gigabits/second/Lane/direction of raw bandwidth such that a x8 link has 20 Gigabits/second of raw bandwidth in each direction.

Cards having a PCIe interface are typically known as "PCIe cards." A computer motherboard has a slot connector (often known as a PCIe slot) for the PCIe card to plug into. Computer motherboards can include different size PCIe slots, such as x1, x4, x8, or x16 PCIe slots. A PCIe card will physically fit and work correctly in any slot that is at last the same size. PCIe supports "down plugging" in which a PCIe card is plugged into a larger sized slot. Thus a x4 card will work in a x16 slot. It is also possible for a slot connector having a large physical size to be wired electrically to utilize a smaller number of lanes. For example, a x16 slot may be wired as a x8 slot.

PCIe supports some optional features to assist board designers. For example, PCIe supports lane reversal. In lane reversal, two PCIe interfaces having the same number of lanes may negotiate a reversal of lanes. For example, if both interfaces have 16 lanes, then if one of the interfaces has lanes 0, 1 . . . 15 lane reversal permits a complete logical reversal of the lanes, i.e., the ordering of the lanes is reversed such that physical lane 15 is treated as lane 0. Lane reversal permits a card to be used in a motherboard even though its physical lane connectors have the opposite intended order with respect to the PCIe slot connector.

The Peripheral Component Interface Express (PCIe) protocol specifies rules for two link partners to negotiate a link using training sets. In the training phase, each data lane receives training sets that are used by LTSSM logic. One constraint is that an endpoint lane, such as lane 0 or lane 15 of a x16 device is mapped to lane 0. That is lane 0 is either the first lane or the last lane. Another constraint is that the total number of lanes is a power of two (e.g., one, two, four, eight, or sixteen). Yet another constraint is that a consecutive set of lanes is selected.

However, PCIe has inherent limitations that limit how cards can be connected on motherboards. In particular, conventional PCIe implementations impose limitations on how lanes can be routed on motherboards. Additionally, conventional PCIe also imposes limitations on how add-in-cards can be used. Therefore, in light of the problems described above the apparatus, system, and method of the present invention was developed.

SUMMARY OF THE INVENTION

A Peripheral Component Interface Express (PCIe) controller performs an arbitrary swizzling of lane ordering of a set of data lanes to an order compliant with PCIe negotiation rules. The reordering permits greater freedom in motherboard lane routing and greater freedom in down plugging configurations. In one embodiment, the controller includes a full crossbar. Arbitrary lane order negotiation logic is used to control the full crossbar to select a logical lane ordering compliant with PCIe negotiation rules.

BRIEF DESCRIPTION OF THE FIGURES

The invention is more fully appreciated in connection with the following detailed description taken in conjunction with the accompanying drawings, in which.

DETAILED DESCRIPTION OF THE INVENTION

Figure 1:
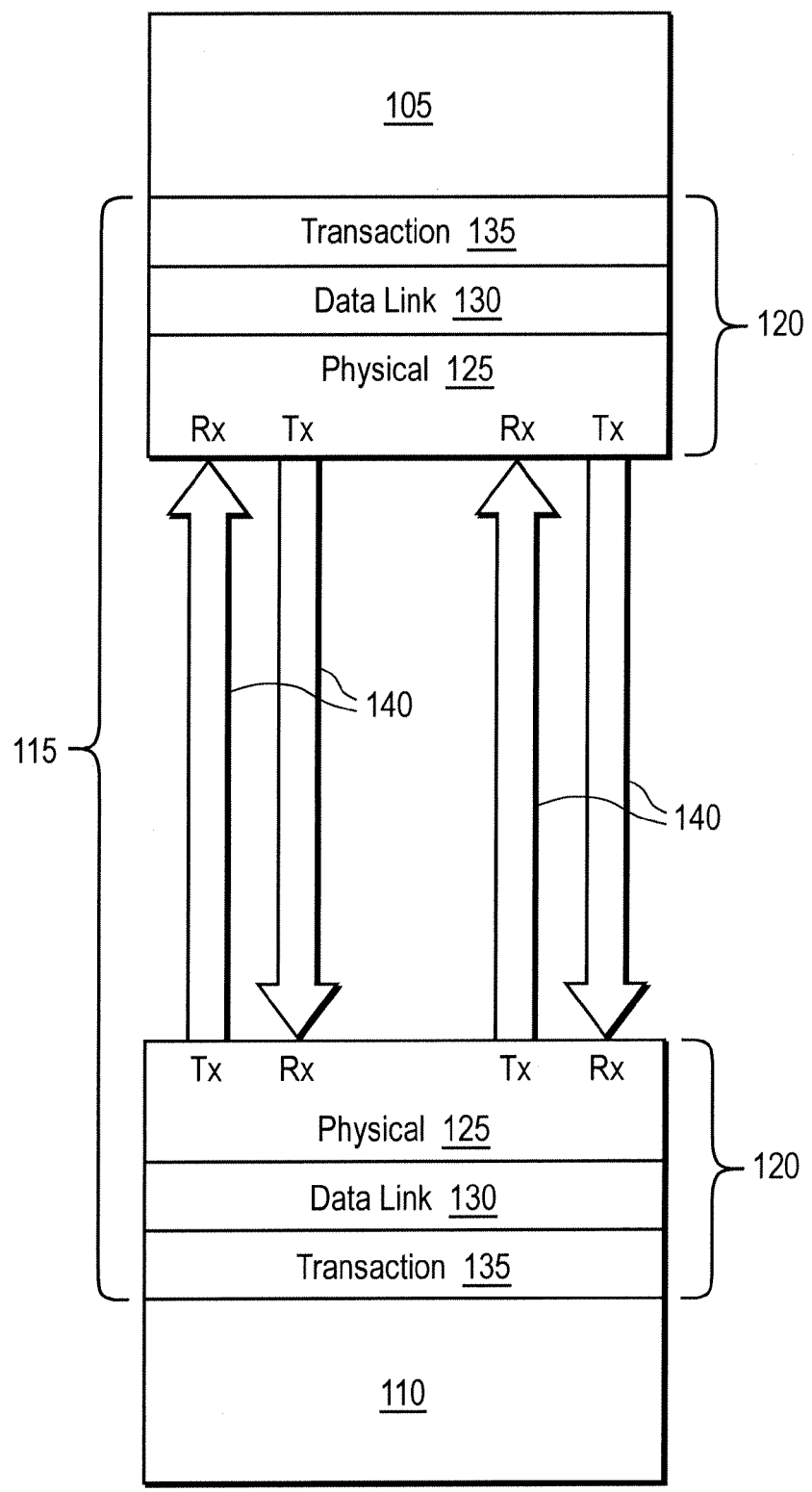
FIGS. 1 and 2 illustrates aspects of conventional PCIe buses known in the prior art.
Figure 2:
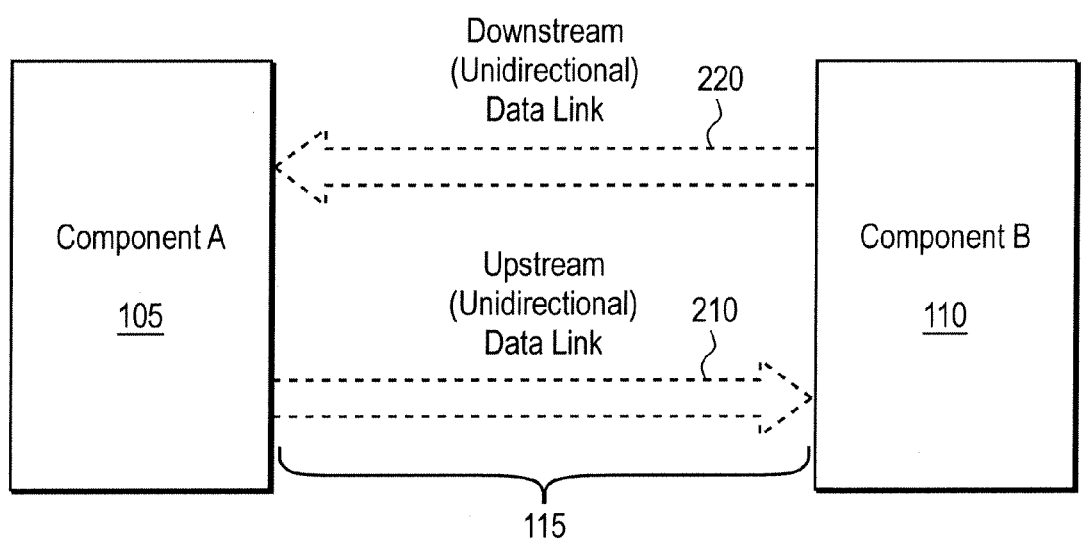
Figure 3A:
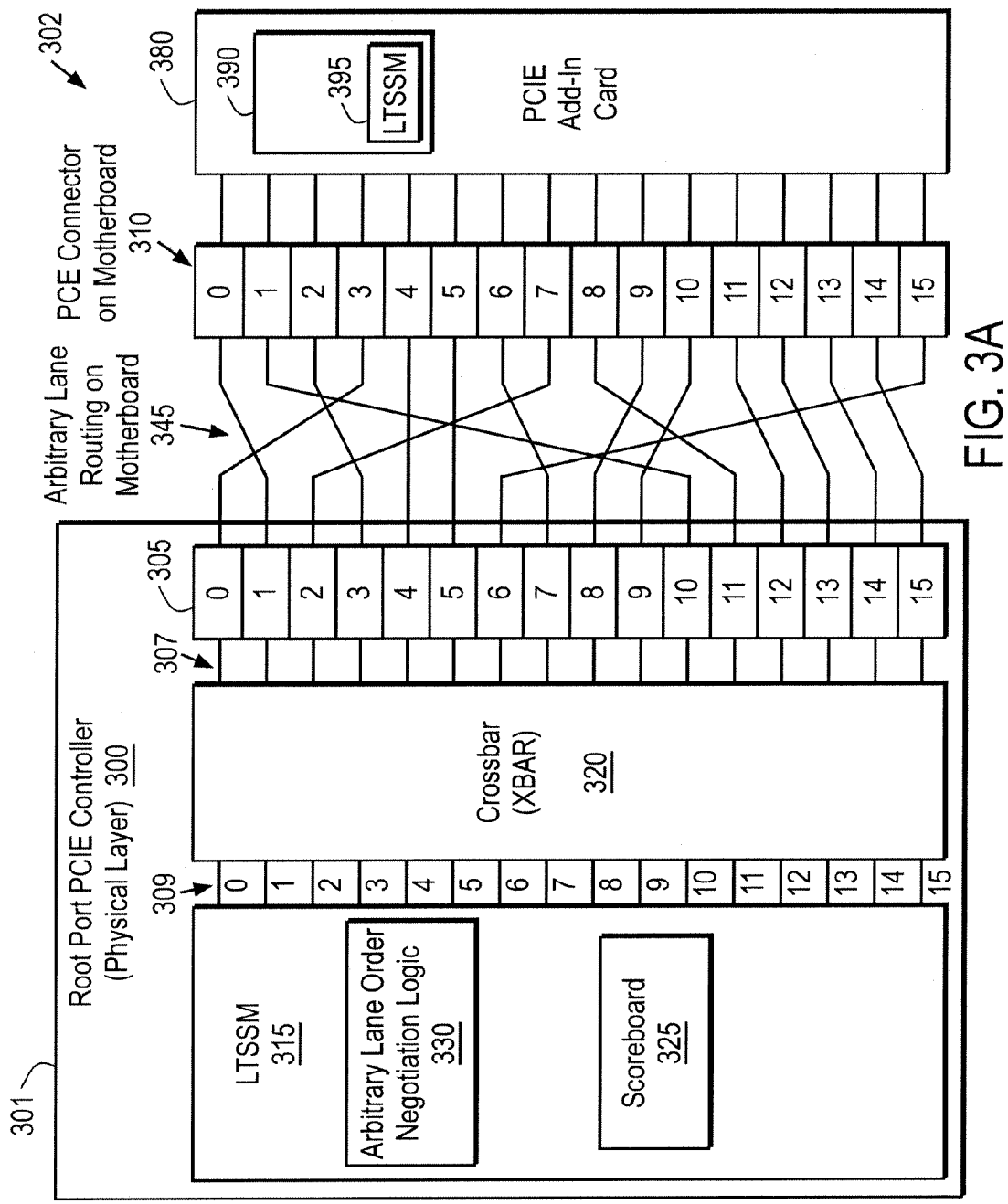
FIGS. 3A, 3B, and 3C illustrates PCIe lane swizzling in accordance with embodiments of the present invention; and Like reference numerals refer to corresponding parts throughout the several views of the drawings.

FIG. 3A illustrates an exemplary PCIe controller 300 in accordance with one embodiment of the present invention. PCIe controller 300 may, for example, be implemented in the physical layer of a root port controller implemented as part of an integrated circuit 301 that is disposed on a motherboard 302. The PCIe controller 300 supports a PCIe bus interface having a plurality of physical data lanes with corresponding physical connector pads 305. The physical connector pads 305 define positions of physical data lanes, such as data lanes 0, 1, 2, 3 . . . 15 of a ×16 interface.

PCIe controller 300 includes a link training and status state machine (LTSSM) 315 to perform PCIe link negotiation with a link partner, such as an endpoint device. PCIe controller 300 also includes features to support lane reordering. A full crossbar 320 has a bi-directional interface 307 coupled to physical connector pads 305 and another bi-directional interface 309 coupled to LTSSM 315 Crossbar 320 is a full crossbar in that it permits an arbitrary swizzling of lane ordering from interface 307 to interface 309. Full crossbar 320 may, for example, be implemented using a set of multiplexers (not shown) to permit an arbitrary mapping of data lanes between interface 307 and interface 309. Full crossbar 320 permits arbitrary lane order negotiation logic 330 to logically reorder the lanes coupled to LTSSM 315 to achieve a lane ordering compatible with PCIe negotiation rules. Thus, if the initial physical lane ordering is incompatible with a successful PCIe link negotiation, the full crossbar 320 permits the lanes to be swizzled to a lane ordering compatible with LTSSM 315 performing a successful link negotiation.

In one embodiment, arbitrary lane order negotiation logic 330 utilizes a scoreboard 325 to track the lane numbers received in the training sets on each lane in an initial lane negotiation phase. The controller 300 marks the scoreboard for each lane. After the scoreboard 325 is fully populated, the arbitrary lane order negotiation logic 320 uses the scoreboard data to determine if the data lanes need to be logically re-ordered to establish a link with the link partner. If the data lanes need to be logically reordered to establish a link, the arbitrary lane order negotiation logic 320 configures the full crossbar 320 to logically re-order the inbound and outbound data lanes such that subsequent PCIe lane/link negotiation phases have an effective lane ordering that is compatible with PCIe negotiation rules.

The scoreboard 325 is used to check for conflicts and to confirm that the negotiation has valid lane selections compatible with PCIe negotiation rules. For example, PCIe negotiation rules require consecutive lane ordering and a link width that is a power of two. In one embodiment, the scoreboard determines lane numbers that were received in training sets and determines a maximum number of consecutive lanes that can be used to establish a link with the link partner. Additionally, the scoreboard confirms that an endpoint lane (e.g., lane 0 or a maximum lane, such as lane 15 of a ×16 interface) maps to lane 0. Controller 300 may also perform one or more steps to confirm that proposed lane numbers are valid. In one embodiment, a sequence of several training sets are checked to confirm that each lane is "locked" to a valid lane number. For example, a lane may be considered "locked" if the training sets which are received have the same lane numbers as those in the training sets which are transmitted.

One application of the present invention is to support an arbitrary lane routing 345 on a motherboard 302 to a PCIe connector 310 of an endpoint device that is a PCIe add-in-card 380. PCIe add-in card 380 has a PCIe controller 390 and LTSSM 395. Note that controller 390 may be a conventional PCIe controller that does not support lane swizzling. Arbitrary motherboard lane routing 345 may, for example, result in a shuffling of lane ordering between connector pads 345 and PCIe connector 310. For example, arbitrary lane routing 345 may be desirable to permit lower-cost manufacturing methods to be utilized for the motherboard lane routing 345. As described below in more detail, the present invention may also be applied to support different down plugging configurations in which the link partner has a smaller PCIe link width than the PCIe connector 310.

PCIe utilizes a broadcast technique for two link partners to perform lane negotiation. In particular, PCIe utilizes training sets to negotiate lane width and ordering. In PCIe, a training set received by a particular data lane begins with the following group of symbols: a comma (com), a link # (a link number such as 0 or 1), and a lane # (a lane number, such as 0, 1, 2 . . . indicating a proposed lane number). However, with arbitrary lane routing 345, PCIe controller 300 will receive a translated version of lane numbers proposed by the other side. For example, in the example of FIG. 3A, lane 0 of connector pad 305 is routed to lane 3 of PCIe connector 310. As a result a training set sent from lane 3 of PCIe connector 310 will be received by lane 0 of controller 300.

In the example of FIG. 3A, an exemplary arbitrary lane routing 345 for a ×16 connector has a physical routing of PCIe controller 307 lanes to PCIe slot connector 310 lanes as follows: lane 0 routed to lane 3, lane 1 routed to lane 0, lane 2 routed to lane 7, lane 3 routed to lane 2, lane 4 routed to lane 4, lane 5 routed to lane 5, lane 6 routed to lane 15, lane 7 routed to lane 6, lane 8 routed to lane 9, lane 9 routed to lane 10, lane 10 routed to lane 1, lane 11 routed to lane 8, lane 12 routed to lane 11, lane 13 routed to lane 12, lane 14 routed to lane 13, and lane 15 routed to lane 14. This arbitrary lane ordering will affect the PCIe training sets received in each data lane.

Assume that at the beginning of link negotiation that crossbar 320 is set to a default mode that performs no lane reordering. Given the exemplary arbitrary lane routing 345 on the motherboard illustrated in FIG. 3A, the root port's LTSSM 315 will therefore receive the following training sets on each of the lanes in an initial phase of negotiation:

Lane 0: com 0 3;
Lane 1: com 0 0;
Lane 2: com 0 7;
Lane 3: com 0 2;
Lane 4: com 0 4;
Lane 5: com 0 5;
Lane 6: com 0 15;
Lane 7: com 0 6;
Lane 8: com 0 9:
Lane 9: com 0 10;
Lane 10: com 0 1;
Lane 11: com 0 8;
Lane 12: com 0 11;
Lane 13: com 0 12;
Lane 14: com 0 13; and
Lane 15: com 0 14.

During the first phase of negotiation the add-in card 380 sees an inverse mapping caused by lane routing 345. Consequently, in the example of FIG. 3A the LTSSM 345 of controller 390 will see the following training sets on each of its data lanes:

Lane 0: com 0 1;
Lane 1: com 0 10;
Lane 2: com 0 3;
Lane 3: com 0 0;
Lane 4: com 0 4;
Lane 5: com 0 5;
Lane 6: com 0 7;
Lane 7: com 0 2;
Lane 8: com 0 11;
Lane 9: com 0 8;
Lane 10: com 0 9;
Lane 11: com 0 12;
Lane 12: com 0 13;
Lane 13: com 0 14;
Lane 14: com 0 15; and
Lane 15: com 0 6.

Note that in this example that a conventional PCIe lane negotiation would fail. The current PCIe specification specifies rules that constrain how a conventional PCIe controller may perform link negotiation. The specific rules which limit the controllers 300 and 390 in the above example are: 1) the lane ordering must start at an endpoint lane (lane 0 or lane 15 for a ×16 interface); and 2) the lane ordering must be consecutive. Additionally PCIe conventionally limits the link width to have a power of two number of data lanes. In the initial negotiation phase above, the proposed lane ordering is not consecutive and does not start at lane 0 or lane 15. A conventional LTSSM built according to the current PCIe specification would thus see that both rules are violated in the above example, and hence link negotiation would ultimately fail.

In contrast, the present invention supports a mode of operation in which lane swizzling is performed if a conventional first phase of negotiation fails. In one embodiment, the lane swizzling is performed by controller 300 without the involvement of the system BIOS. In this embodiment, the initial received training sets in the first phase of lane negotiation are used by controller 300 to determine a logical reordering necessary for LTSSMs 315 and 395 to see a sequential ordering compliant with PCIe negotiation rules. When training sets are first received, the root port LTSSM's arbitrary lane order negotiation logic 330 utilizes the scoreboard 325 to track the lane numbers received in the training sets on each data lane. After the scoreboard is fully populated, the arbitrary lane order negotiation logic 330 uses the scoreboard 325 data to automatically configure the full crossbar 320 to re-order the inbound and outbound data based on the lane numbers received in the training sets. In one implementation, arbitrary lane order negotiation logic 330 selects a configuration of full crossbar 320 that compensates for the lane routing on the motherboard such that each LTSSM 315 and 395 sees a sequential lane ordering compatible with PCIe negotiation rules. The crossbar, once configured, causes both LTSSM 315 in the root port and the LTSSM 395 in the add-in card 380 to see training sets in order (Lane 0 sees "com 0 0" . . . . Lane 15 sees "com 0 15"). From that point forward, link negotiation proceeds as if the lanes were routed in sequential order, starting at lane 0. That is, in subsequent training sets the lane ordering proposed by either side will be acceptable. As a result the PCIe lane rules above are satisfied, and ultimately the link trains to its full ×16 width.

Figure 3B:
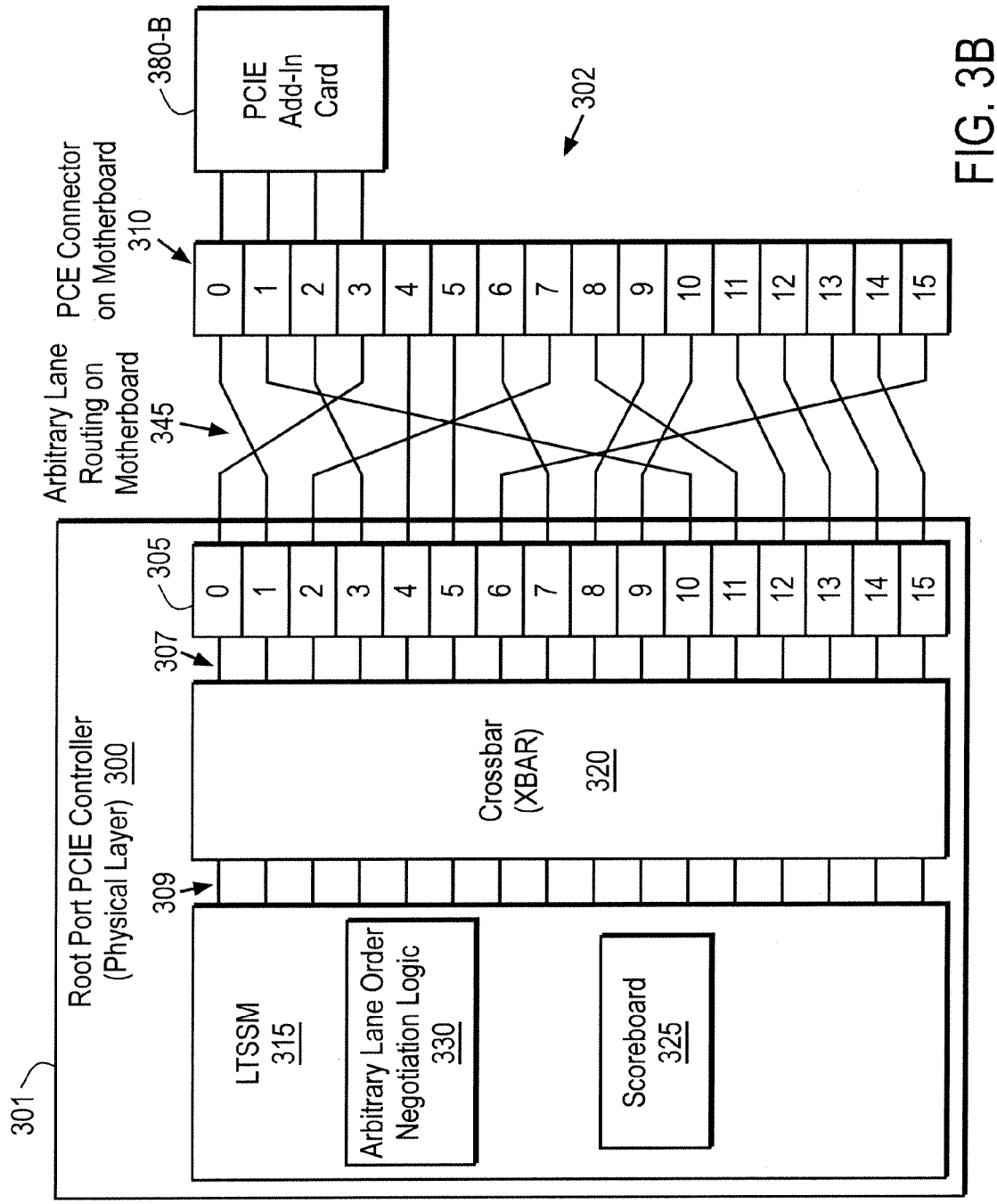

Referring to FIG. 3B, the lane swizzling may also be utilized to support PCIe link negotiations with a PCIe add-in card 380-B having a smaller number of lanes than the PCIe connector 310. One situation that arises in motherboard assembly is that add-in-cards may have a number of PCIe lanes less than that of the PCIe connector, what is known as "down plugging." In this example, the routing of the lanes on the motherboard is identical to the previous example, but a ×4 add-in card is inserted into the ×16 PCIe connector, rather than a full-width ×16 card. Consequently, only four of the lanes (0, 1, 3, and 10) of the physical connector pad 305 will receive training sets from the PCIe add-in card 380-B.

During the first phase of link negotiation, the root port's LTSSM 315 will receive the following training sets on each of the lanes (a blank entry implies that no training sets are received on that lane):

Lane 0: com 0 3;
Lane 1: com 0 0;
Lane 2: blank entry;
Lane 3: com 0 2;
Lane 4: blank entry;
Lane 5: blank entry;
Lane 6: blank entry;
Lane 7: blank entry;
Lane 8: blank entry;
Lane 9: blank entry;
Lane 10: com 0 1;
Lane 11: blank entry;
Lane 12: blank entry;
Lane 13: blank entry;
Lane 14: blank entry; and
Lane 15: blank entry.

During the first phase of negotiation, the add-in card 380-B will see the following training sets on each of its lanes (note that the add-in card has only four lanes):

Lane 0: com 0 1;
Lane 1: com 0 10;
Lane 2: com 0 3; and
Lane 3: com 0 0.

Note that in the example of FIG. 3B that a conventional LTSSM 315 built according to the current PCIe specification would see PCIe lane ordering fail, and hence link negotiation would ultimately fail. That is, the lane ordering does not start at lane 0 or lane 15 and also the lane ordering is not consecutive. However, in accordance with the present invention, arbitrary lane order negotiation logic 330 configures full crossbar 320 to achieve a sequential lane ordering consistent with the PCIe negotiation rules. It will thus be understood that one benefit of the present invention is that it supports a variety of PCIe add-in-card down plugging options. The combination of the full crossbar 320 and arbitrary lane order negotiation logic 330 permits conventional add-in-cards having different link widths to be used.

As previously described, in one embodiment, PCIe controller 300 performs lane swizzling automatically without additional system BIOS information. However, in some applications it may be a desirable option to provide PCIe controller 300 with auxiliary information as contextual information for determining lane reordering. For example, the auxiliary information may include information describing the motherboard lane routing. In one embodiment, auxiliary information is stored as system BIOS (SBIOS) information that is provided to support down plugging with arbitrary lane routing. An advantage of providing SBIOS to PCIe controller 300 is that it assists PCIe controller 300 to address situations where one or more lanes have gone bad. As an illustrative example, suppose first that no SBIOS is provided to PCIe controller 300 to indicate that there is a down plugging configuration. In the scenario above where the lanes are re-routed on the motherboard and a smaller PCIe card is plugged in, the arbitrary lane order negotiation logic 330 has no way of knowing if the "gaps" that it sees on lanes 2, 4, 5, 6, 7, 8, 9, 11, 12, 13, 14, 15 are because of poor signaling, or because of the motherboard rerouting. Thus, in this specific example, the arbitrary lane order negotiation logic 330 benefits from prior knowledge of how the lanes are physically re-routed on the motherboard. The motherboard routing is decided at design time, and hence the SBIOS can store hard-coded routing information. The SBIOS programs this information into the arbitrary lane order negotiation logic 330 prior to PCIe reset release.

Figure 3C:
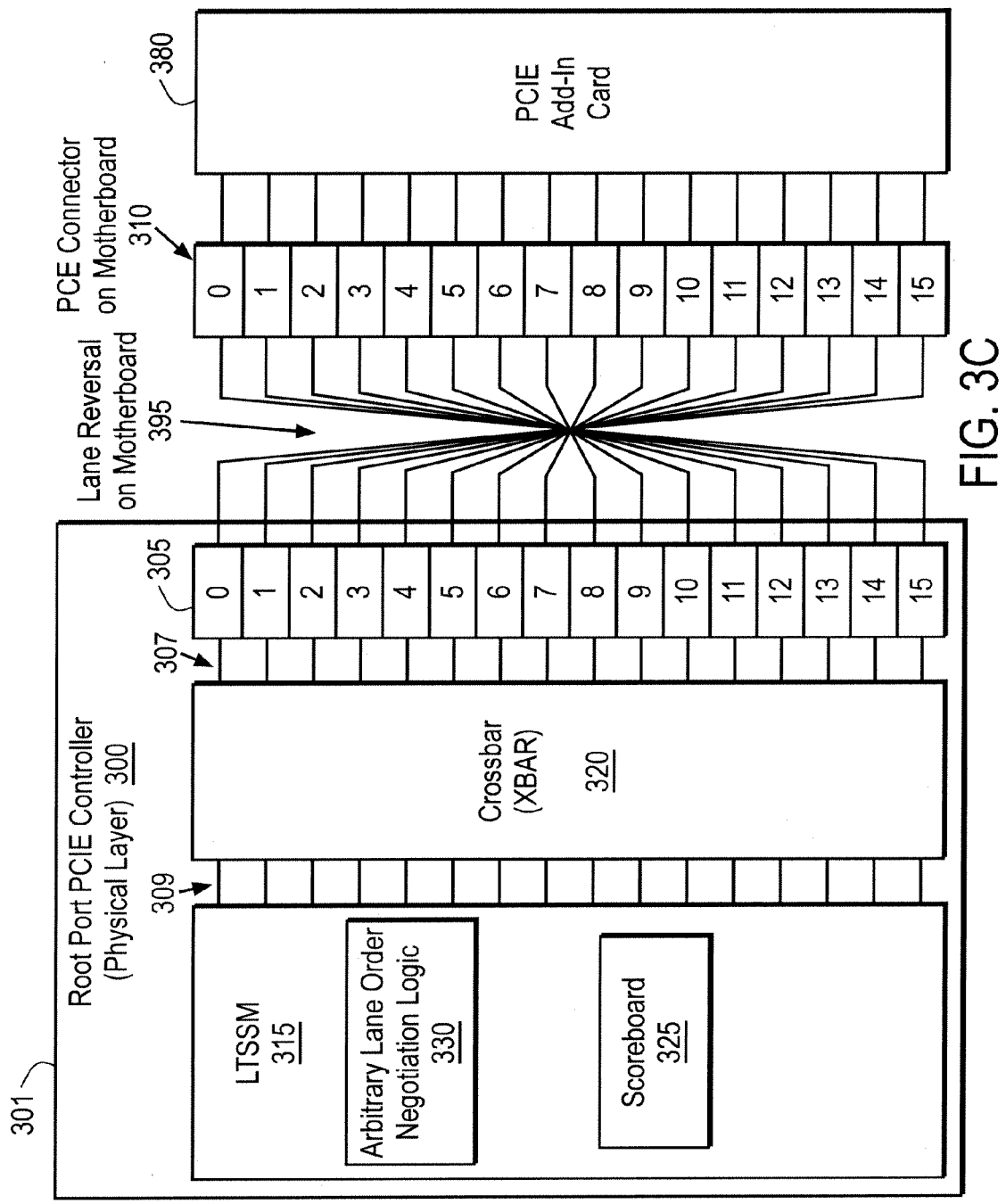

Referring to FIG. 3C, it will be understood that the present invention may also be utilized to support conventional lane reversal on the motherboard. Thus, the present invention may be used to support conventional PCIe lane routing (normal forward sequential or reverse order) in addition to an arbitrary lane routing.

While PCIe is an exemplary protocol, it will be understood that the embodiments of the present invention may also be applied to other bus protocols in which a link is formed by configuring a set of data lanes in which the link negotiation has rules defining a proper lane ordering.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. An integrated circuit, comprising:
a Peripheral Component Interface Express (PCIe) controller configured to perforin a swizzling of lane ordering to an order compliant with PCIe negotiation rules, said PCIe controller supporting a down plugging configuration in which a link partner has a smaller number of operable data lanes than said PCIe controller;
wherein said PCIe controller includes a full crossbar to perform physical-to-logical lane swizzling.

2. The integrated circuit of claim 1, wherein said full cross bar performs swizzling of lane ordering for a link training and status state machine (LTSSM).

3. The integrated circuit of claim 1, wherein said PCIe controller detects proposed lane numbers from said link partner during a negotiation phase and in response configures said full crossbar to comply with at least one PCIe link negotiation constraint.

4. The integrated circuit of claim 2, wherein said PCIe controller detects proposed lane numbers from said link partner during a negotiation phase and in response configures said crossbar to comply with at least one PCIe link negotiation constraint of lane ordering for said LTSSM.

5. The integrated circuit of claim 3, wherein said PCIe controller configures said crossbar to swizzle lane ordering to satisfy at least one of a PCIe lane zero rule and a consecutive lane rule.

6. The integrated circuit of claim 4, wherein said PCIe controller configures said crossbar to swizzle lane ordering to satisfy at least one of a PCIe lane zero rule and a consecutive lane rule.

7. The integrated circuit of claim 1, wherein said PCIe controller is a root port PCIe controller for establishing a PCIe link on a motherboard.

8. The integrated circuit of claim 7, wherein swizzling of lane ordering is performed to compensate for a non-sequential lane routing on said motherboard to a PCIe connector of said link partner.

9. The integrated circuit of claim 8, wherein swizzling of lane order is performed to accommodate a down plugging arrangement in which an add-in-card has a PCI link width less than that of a slot connector in which the add-in-card is inserted.

10. A controller for a Peripheral Component Interface Express (PCIe) link, comprising:
a link training and status state machine (LTSSM) to configure a set of data lanes as a link with a link partner;
a full crossbar coupling said LTSSM to physical data lanes, said full crossbar capable of performing arbitrary lane swizzling; and
arbitrary lane order negotiation logic to control said full crossbar to select a logical lane ordering compliant with PCIe negotiation rules for a down plugging configuration in which a link partner of lane ordering to an order compliant with PCIe negotiation rules;
said controller operative to compensate for arbitrary lane routing to a link partner in a down plugging configuration in which the link partner has a smaller set of operative data lanes.

11. The controller of claim 10, further comprising a scoreboard to track proposed lane numbers received in training sets for each lane from said link partner during an initial negotiation phase, said arbitrary lane order negotiation logic reading said scoreboard after said initial negotiation phase and performing a logical lane reordering of said full crossbar such that in subsequent negotiations said LTSSM receives a logical lane ordering compliant with PCIe negotiation rules.

12. The controller of claim 10, wherein said controller is a root port PCIe controller.

13. The controller of claim 10, wherein said controller performs logical lane reordering to compensate for non-sequential lane routing on a motherboard.

14. The controller of claim 13, wherein said controller performs logical lane reordering to support down plugging with an add-in-card.

15. The controller of claim 10, wherein said logical lane ordering satisfies a rule that lane zero of said LTSSM corresponds to an end lane.

16. The controller of claim 10, wherein said logical lane ordering satisfies a consecutive lane rule that said LTSSM operates on a group of consecutive lanes.

17. An integrated circuit, comprising:
a root port controller for a Peripheral Component Interface Express (PCIe) link, including:
a set of data lanes;
a link training and status state machine (LTSSM);
a scoreboard to track proposed lane numbers received in training sets for each lane during an initial negotiation phase received from a link partner;
a full crossbar coupling physical lane connector pads to said LTSSM to map physical lane numbers of said set of data lanes to logical lane numbers of said LTSSM; and
arbitrary lane order negotiation logic reading said scoreboard after said initial negotiation phase and performing a logical lane reordering such that in subsequent negotiations said LTSSM receives a logical lane ordering compliant with PCIe negotiation rules;
said root port controller operative to establish a link with a link partner coupled to said root port controller via non-sequential motherboard lane routing, said root port controller including a mode of operation in which an endpoint link partner is coupled to said root port controller in a down plugging configuration having a smaller number of operable data lanes.

18. The integrated circuit of claim 17, wherein said logical lane ordering satisfies a first rule that lane zero of said LTSSM corresponds to an end lane and a second rule that said LTSSM operates on a group of consecutive lanes.

19. The integrated circuit of claim 17, wherein said arbitrary order negotiation logic performs a logical lane ordering that results in said LTSSM being coupled to data lanes in a sequential lane ordering.

* * * * *